Aug. 30, 1932.  G. D. PARKER  1,875,260
BUNDLE BINDING AND TYING MACHINE
Filed March 12, 1925   10 Sheets-Sheet 1

INVENTOR
George D. Parker.
BY
his ATTORNEYS

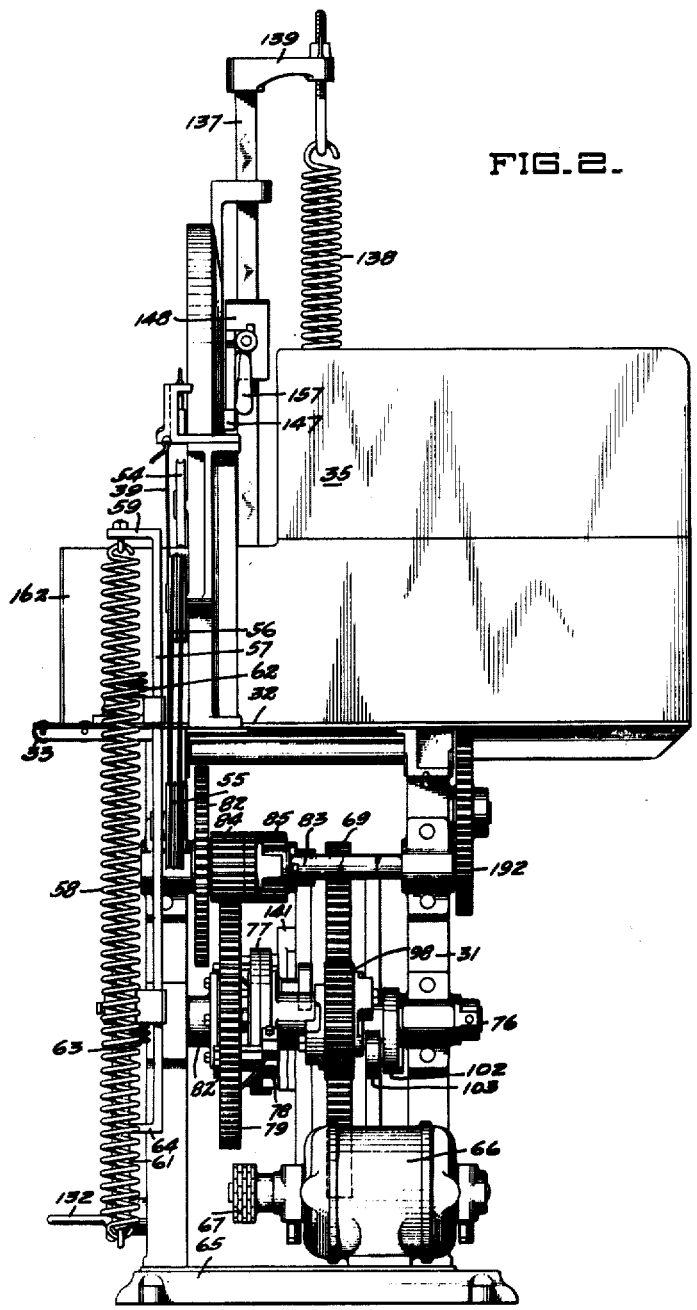

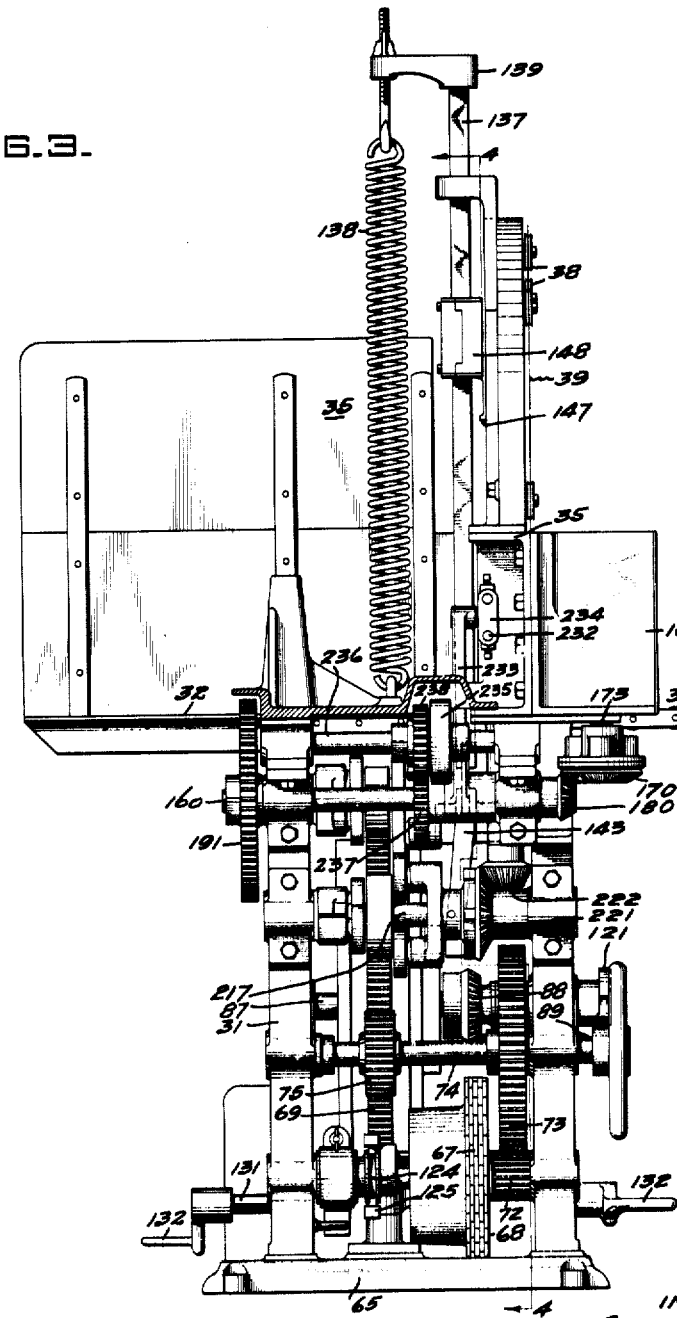

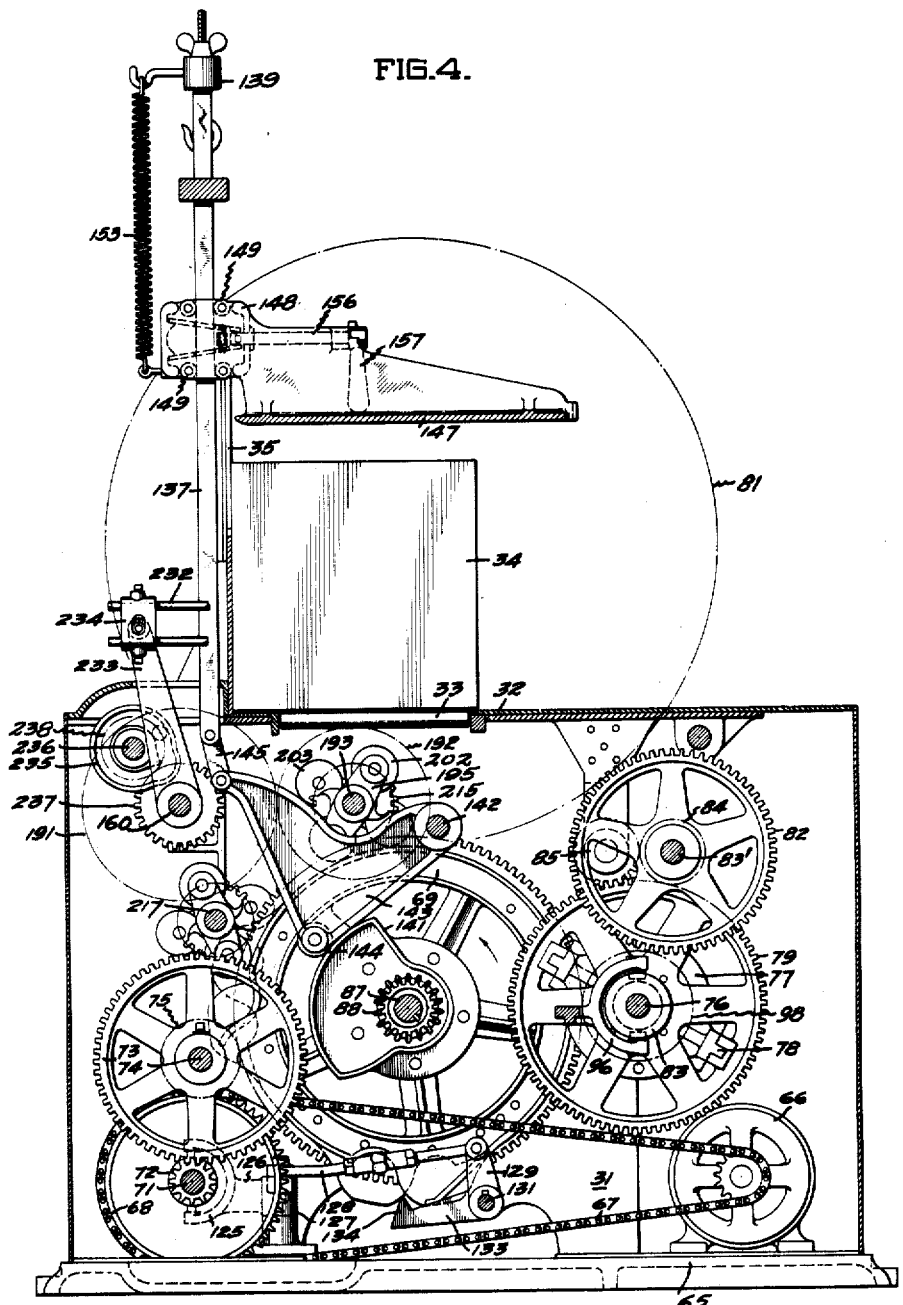

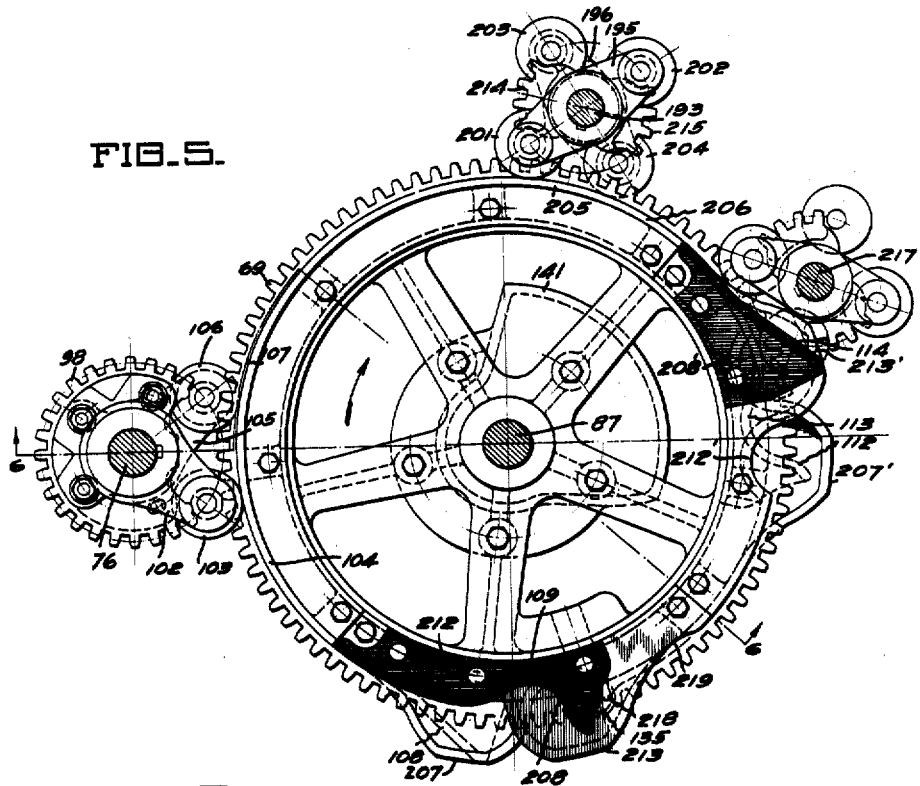

INVENTOR
George D. Parker
his ATTORNEYS

Aug. 30, 1932.   G. D. PARKER   1,875,260
BUNDLE BINDING AND TYING MACHINE
Filed March 12, 1925   10 Sheets-Sheet 7
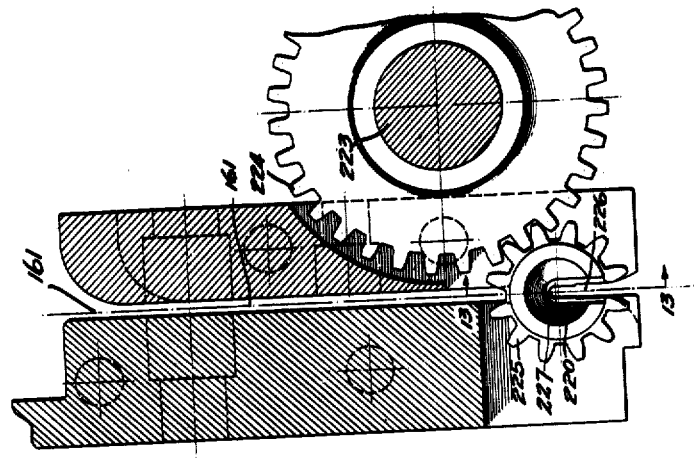
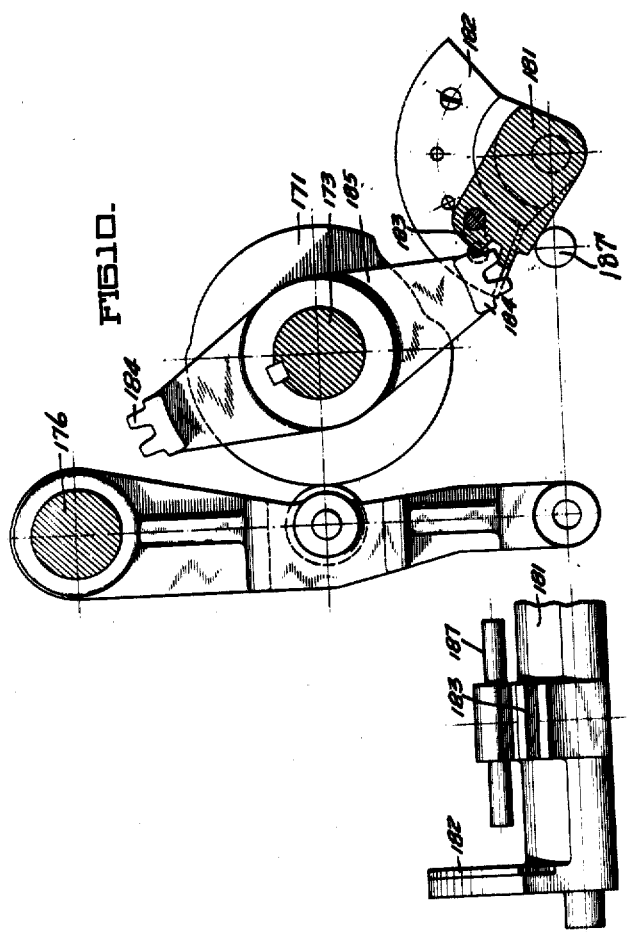
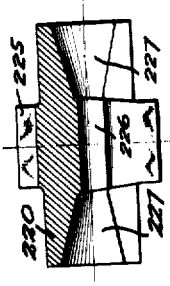
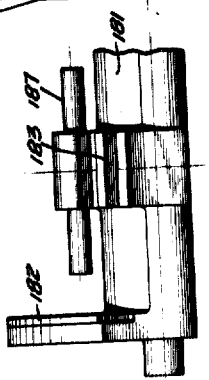
INVENTOR
George D. Parker.
BY White Prost Kraus
his ATTORNEYS Aug. 30, 1932.　　　G. D. PARKER　　　1,875,260
BUNDLE BINDING AND TYING MACHINE
Filed March 12, 1925　　10 Sheets-Sheet 8

INVENTOR
BY George D. Parker
his ATTORNEYS.

Aug. 30, 1932.  G. D. PARKER  1,875,260
BUNDLE BINDING AND TYING MACHINE
Filed March 12, 1925   10 Sheets-Sheet 9
FIG.22.
FIG.20.
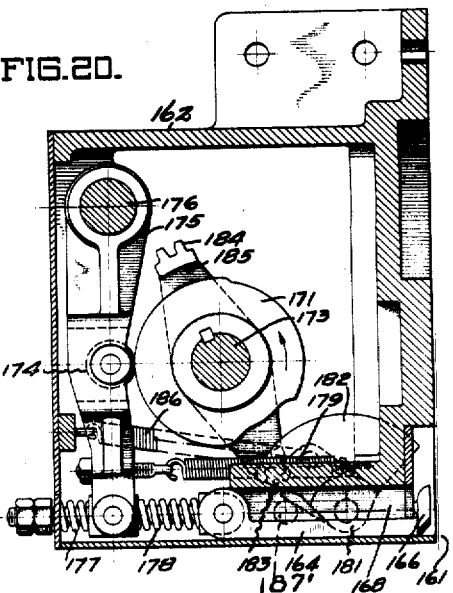
FIG.23.   FIG.21.   FIG.25.
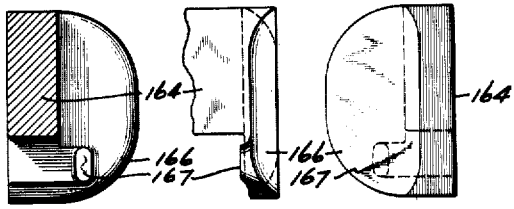
FIG.24.
FIG.18.
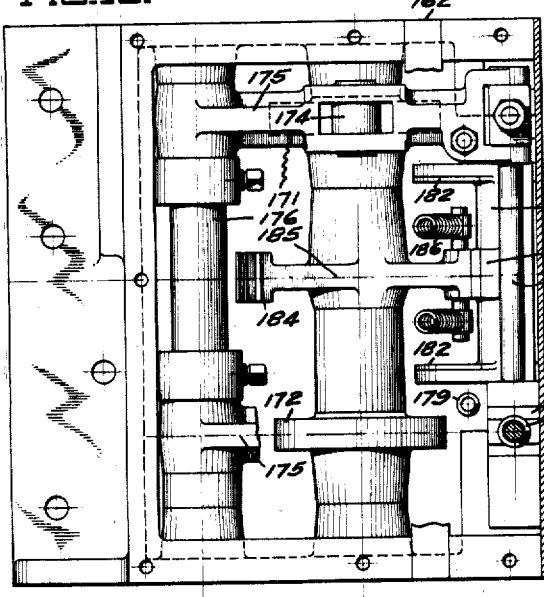
FIG.19.
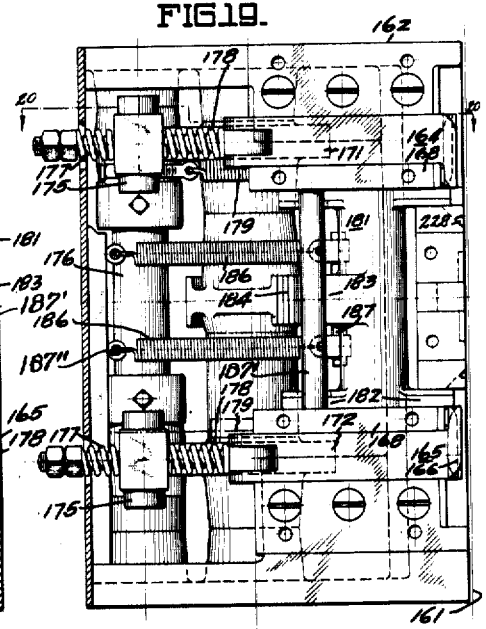
INVENTOR
By George D. Parker.
White Prost Trauss
his ATTORNEYS.

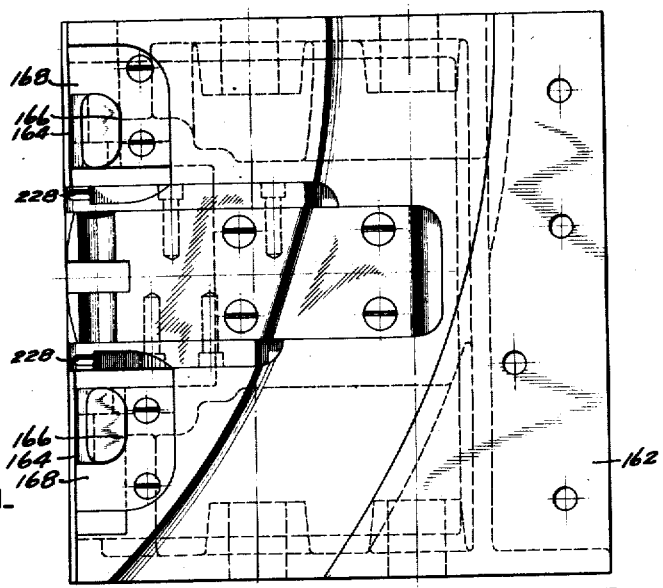
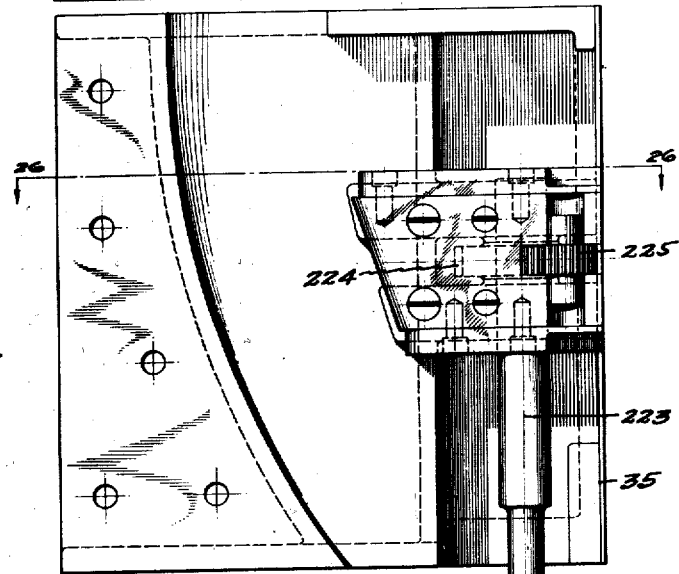
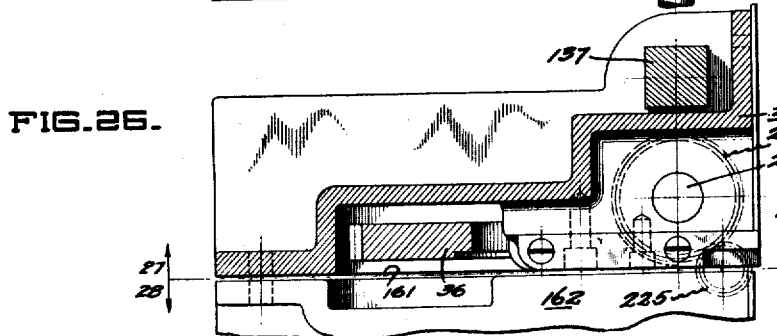

Patented Aug. 30, 1932

1,875,260

UNITED STATES PATENT OFFICE

GEORGE D. PARKER, OF RIVERSIDE, CALIFORNIA; CLARA B. PARKER, EXECUTRIX OF SAID GEORGE D. PARKER, DECEASED, ASSIGNOR OF ONE-HALF TO JAMES M. LEAVER, JR., OF OAKLAND, CALIFORNIA

BUNDLE BINDING AND TYING MACHINE

Application filed March 12, 1925. Serial No. 14,933.

The invention relates to a bundle tying machine of that class in which a wire is secured taut about a bundle which may consist of a number of articles of like kind assembled together, a box, or any kind of a package or bundle of limited dimensions about which it is desired to secure a binding wire.

An object of the invention is to provide a wire tying machine in which the wire is tied tight around the bundle.

Another object of the invention is to provide, in a wire tying machine, means for forming a flat knot of the wire, which will lie flat against one of the sides of the bundle.

A further object of the invention is to provide means for holding the end of the wire, so that the wire may be wound very tightly around the bundle, thus producing a tie which is bound to hold.

Another object of the invention is to provide a bundle tying machine in which the wire which is passed around and secured to the bundle is taken directly from a coil of wire and is not severed from the coil until after the wire has been tied around the bundle.

Another object of the invention is to provide a tying means which is arranged contiguous to one side of the bundle and which is halted in position to discharge the tie toward the contiguous side of the bundle, thereby not only facilitating the removal of the tie from the tying means but also avoiding the production of slack in the tying wire.

A further object of the invention is to provide means for clamping or holding the bundle in a fixed location during the time that the tensioned wire is passed around and tied around the bundle, so as to facilitate the passing and tying operations.

A further object of the invention is to provide a bundling machine in which the tying wire is bent around a gripper, thereby greatly increasing the holding effect of the gripper and permitting the wire being passed around the bundle to be held under a high tension.

Another object of the invention is to provide means for passing a wire around a bundle which is operable during one cycle of its operation to pass a wire around a bundle in one direction and which is operable in an opposite direction upon completion of said cycle.

A further object of the invention is to generally improve machines of this character to increase the tying capacity of the machines, to improve the holding qualities of the tying wire and to generally improve the characteristics of the tied bundle.

The invention possesses other advantageous features, some of which, with the foregoing, will be set forth at length in the following description, where I shall outline in full that form of my invention which I have selected for illustration in the drawings accompanying and forming part of the present specification. In said drawings I have shown one form of bundle tying machine embodying my invention, but it is to be understood that I do not limit myself to such form, since the invention, as set forth in the claims, may be embodied in a plurality of forms.

Referring to said drawings:

Figure 2 is an end elevation of the machine, a portion of the enclosing housing being removed to disclose the details of construction.

Figure 3 is an elevation of the other end of the machine, a portion of the enclosing housing being removed.

Figure 4 is a vertical section of the machine taken on the line 4—4 Figure 3.

Figure 5 is an elevation of the master driving gear forming part of the machine, the view being taken from the rear, so that the master gear rotates in a direction opposite to that indicated in Figure 4.

Figure 6 is a section through the master gear taken on the line 6—6 Figure 5.

Figure 10 is a horizontal section through the means for operating the grippers and the cutting mechanism.

Figure 11 is an elevation in detail of a portion of the cutter.

Figure 12 is a horizontal section taken through the wire twisting means and its cooperating structure.

Figure 13 is a longitudinal section taken on the line 13—13 Figure 12.

Figure 14 is an elevation of the tie or twist.

Figure 18 is a front elevation of the gripper and cutter operating means, the coverplate of the housing being removed to disclose the structure.

Figure 19 is a side elevation of the gripper and cutter operating means, the coverplate being removed to disclose the structure.

Figure 20 is a horizontal section through the gripper and cutter actuating means, taken on the line 20—20, Figure 19.

Figure 21 is an elevation of a gripper head, Figures 22 and 24 being plan views of the gripper head, and Figures 23 and 25 being side elevations of the gripper head.

Figure 26 is a horizontal section through the frame and the gripper actuator housing, showing the twisting device.

Figure 27 is an elevation of the frame taken on the line 27—27 of Figure 26.

Figure 28 is an elevation of the side of the gripper actuator mechanism housing taken on the line 28—28 Figure 26.

Figure 1:
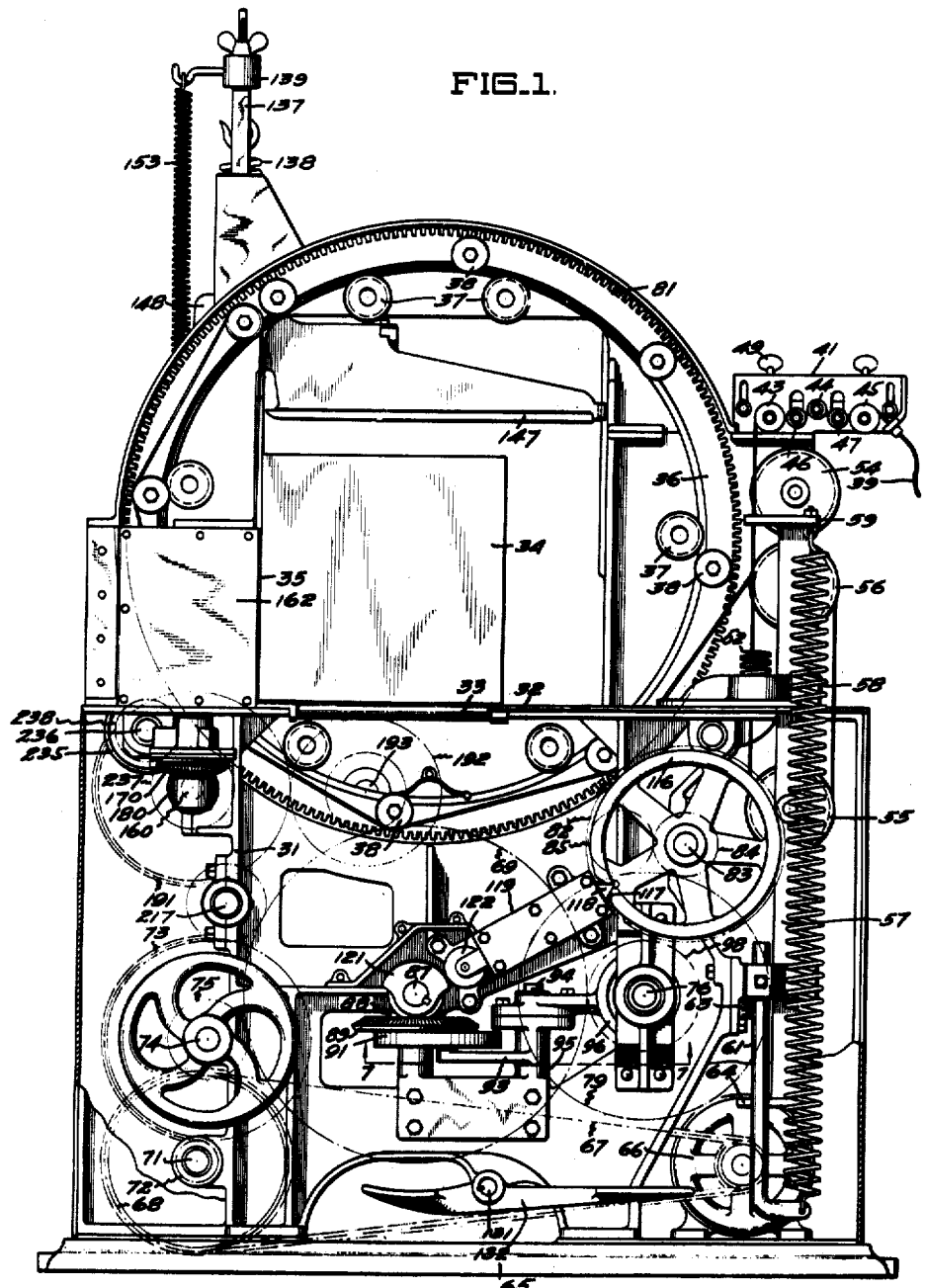
Figure 1 is a front elevation of a bundle binding and tying machine embodying my invention.

This application is a continuation in part of my copending application, Serial No. 723,769, filed July 2, 1924, many features of the earlier filed case being common to those disclosed in this application. For example, the twister constrained with respect to the frame and in which portions of the wire are overlapped; the means for mounting the twister, so that its slot faces away from the bundle to receive the wire and discharges the knot toward the bundle; and the winding ring are all disclosed in the prior application.

The machine of my invention is constructed to draw wire from a coil, place the wire under tension and pass it around a bundle or box, and tie the wire around the bundle or box. The machine is provided with a knotter or wire twisting device, into which overlapping portions of the wire are introduced by the means which passes the wire around the bundle. The wire is in tension and is gripped at opposite sides of the tying or twisting device and the twisting device is then operated to tie the wire encircling the bundle. Means are provided for then cutting the tied wire from the length of wire taken from the coil and for ejecting or effecting removal of the tie from the twisting device. The twisting device is so arranged that the wire is introduced thereinto, as the wire is passed around the bundle and, at the end of its twisting operation, the twisting device is so positioned that its exit slot faces the side of the bundle, so that the tie may readily be ejected from the twisting device. The means for passing the wire around the bundle is movable in opposite directions, that is, in one direction of movement it passes the wire around the bundle in one direction and is then movable in an opposite direction. This reversal of movement of the means for passing the wire around the bundle not only causes the end of the wire to be bent around the gripper, thus greatly increasing the holding effect of the gripper and permitting the wire to be held under high tension but also enables the formation of flat knots, from overlapping portions of the wire, which can be tied always in the same fixed position relative to the machine. Furthermore, in case it is desired to obviate the necessity of returning the winding or wire passing means to starting position after each winding of the wire, the reversal of movement of such means, upon formation of the knot, can be utilized to pass the wire successively in opposite directions, which latter arrangement is preferred by me due to the saving in operating time obtained thereby. The machine also embodies means for timing the operation of the wire-feed reversing means and for timing the operation of the twisting means, the cutters and the grippers. Means are also provided for maintaining the wire taut, by taking up any slack therein which is caused by the reversal of the direction of operation of the wire passing means. The machine also embodies other features of construction and operation which will become apparent as the specification proceeds.

The machine comprises a frame 31 which is suitably constructed to support the various instrumentalities entering into the construction of the machine. The frame is provided with a table 32 on which the bundles to be tied are placed and the table is preferably provided with a series of rollers 33 to facilitate the movement of the bundles into and out of the machine. The frame extends upward above the table 32 and is provided with an opening extending therethrough, through which the bundle 34 is passed. The frame is also provided, above the table 32, with a back wall 35 against which the bundle to be tied is placed and which serves as a guide for properly positioning the bundle.

In accordance with the operation of the machine, wire is drawn from a coil, is placed under tension and is passed completely around the bundle, so that portions of the wire are in overlapping arrangement, and these overlapping portions are twisted together to tie the wire around the bundle. The means for passing the wire around the bundle comprises a ring 36, rotatably mounted in the frame and surrounding the table 32, the back wall 35 and the opening in the frame through which the bundle is inserted. The ring 36 is mounted on a plurality of spaced rollers 37, journalled on studs secured to the frame, so that the ring may be readily rotated about its axis. Mounted on the ring are a plurality of grooved rollers 38 over which the wire passes. One end of the wire is held fixed by a gripper, so that as the ring rotates the wire feeds over the rollers 38 and is passed around the bundle. As seen from Figure 1, two of the grooved rollers 38 are placed with their peripheries close together, thus forming a guide member enabling the wire to lead off from either of the rollers or both during winding of the wire. The ring, in each cycle of operation, rotates more than one revolution to bring portions of the wire surrounding the bundle into overlapping position.

The wire 39 is taken from a coil arranged in any suitable location, passes through a tensioning device 41, thence through a slack take-up device which will be hereinafter described, and thence passes to the rollers 38 on the ring 36 as the ring rotates. The tensioning device 41 comprises a frame 42 having a plurality of spaced grooved rollers 43—44—45 mounted thereon. Arranged intermediate the rollers 43 and 44, and 44 and 45, are grooved rollers 46 and 47, which are journalled on a bar 48, the position of which may be adjusted by the set screws 49. The bar is held in adjusted position by the cap screws 51 and the frame 42 is provided with elongated apertures 52 to permit the vertical movement of the stub shafts on which the rollers 46 and 47 are mounted. The wire enters the tensioning device through the guide 53 and passes successively over and under the rollers 45, 47, 44, 46 and 43. By varying the position of the rollers 46 and 47, with respect to the rollers 43, 44 and 45, the amount of flexure of the wire as it passes through the tensioning device may be controlled and consequently the tension of the wire may be controlled. It is manifest that a large force must be exerted to pull the wire through the tensioning device and this force is a measure of the tension in the wire. The tension is usually maintained constant for any one size of wire but may be adjusted for different sizes of wire or for bundles of different nature.

From the tensioning device 41 the wire passes the guide roller 54 and thence passes a plurality of times over the grooved rollers 55 and 56. The roller 56 is journalled in the frame and the roller 55 is journalled in a slide 57 which is guided in the frame and which is continuously pressed downward by the coiled spring 58, which is secured at its upper end to the head 59 of the slide and which is secured at its lower end to the adjustable bracket 61, secured to the frame. The spring 58 maintains the wire taut on the ring 36 during the operation of the machine. In such operation, the direction of rotation of the ring is reversed, and this reversal tends to produce slack in the wire on the ring, and when this occurs the spring moves the roller 55 downward, taking up the slack and maintaining the wire taut. A spring 62 serves as a shock absorber to cushion an excessive downward movement of the slide 57 and a similar spring 63, in line with the foot 64 of the slide, serves the same purpose in the upward movement of the slide, the wire not being drawn through the tension device until the slide is stopped by the lower spring 63.

As has been stated before, the ring 36 is rotatable in one direction to complete a cycle of operation and is then rotatable in the opposite direction to complete another cycle of operation. I shall now describe the means for driving and reversing the direction of rotation of the ring.

Mounted on the base 65 of the frame is a driving motor 66, which is suitably connected, as by means of a driving chain 67, with the sprocket wheel 68. Speed reducing gearing is interposed between the sprocket wheel 68 and the master gear 69. Arranged on the shaft 71 of the sprocket wheel 68 is a gear 72 which is connected to the shaft by means of a clutch which will hereinafter be described. The gear 72 meshes with a larger gear 73 secured to the shaft 74 journalled in the frame and secured to the shaft 74 is a gear 75 which meshes with the teeth of the master gear 69. The master gear thus rotates in one direction as long as the gear 72 is clutched to the shaft 71.

Journalled in the frame of the machine is a shaft 76 to which is secured a hub 77 having guide rails 78 thereon, arranged parallel to the axis of the shaft. Mounted on the guide rails so that it is movable in the direction of the axis of the shaft is a driving gear 79 having a hub 80 which is secured to a sleeve 82' slidable axially on the shaft 76. The sleeve 82' is provided with a grooved collar 83' which is engaged by shifting means, operation of which serves to shift the gear 79 axially with respect to the shaft 76.

The ring 36 is provided on its periphery with a gear 81 which is in mesh with a gear 82 secured to the shaft 83 journalled in the frame. Secured to the shaft 83 is a gear 130

Figure 7:
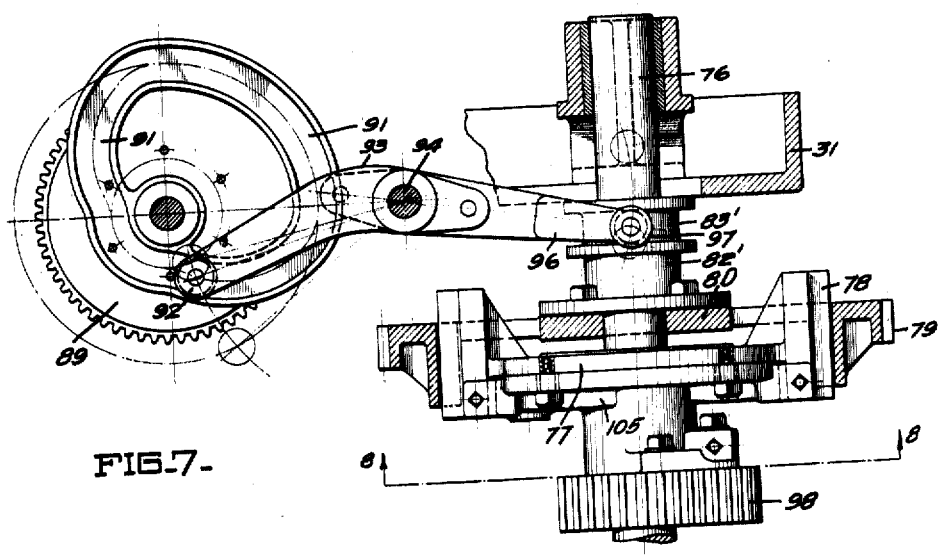
Figure 7 is a detail of the mechanism showing the means for reversing the direction of rotation of the means for passing the wire around the bundle.
Figure 8:
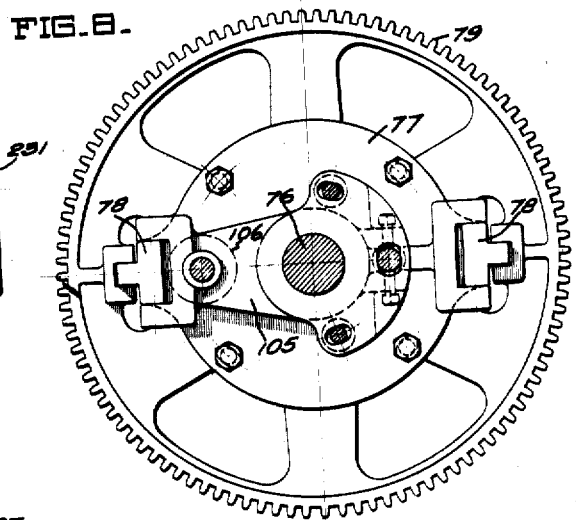
Figure 8 is a cross-section taken on the line 8—8 Figure 7.

84 and meshing with the gear 84 and offset axially with respect thereto is a gear 85. The gears 84 and 85 are arranged with their pitch circles in planes adapted to be intersected by the pitch circle of the gear 79. The gear 79 is shiftable axially so that it will mesh with either the gear 84 or the gear 85. These two latter gears are of the same diameter and, when the gear 79 is in engagement with the gear 85, the gear 82 will rotate in one direction and when the gear 79 is in engagement with the gear 84, the gear 82 will rotate in the opposite direction. Since the gear 82 is in mesh with the gear 81 on the ring, lateral shifting of the gear 79 serves to reverse the direction of rotation of the ring 36. Means are provided for shifting the gear 79 after the ring 36 has been brought to rest at the end of a cycle of operation in either direction. Secured to the shaft 87 of the master gear 69 is a bevelled pinion 88 which is in mesh with a bevelled pinion 89, the axis of which is vertically disposed. Secured to the bevelled pinion 89, as shown in Figure 7, is a cam 91 having a cam groove in which is disposed the roller 92 mounted on the end of the shifting lever 93, which is fulcrumed on the shaft 94 supported in the bracket 95 secured to the frame. At its other end the shifting lever 93 is provided with a fork 96 carrying rollers 97 which engage in the groove of the collar 83'. The cam 91 is shaped to shift the gear 79 into and out of mesh with the gears 84 and 85 respectively at the proper time. The bevelled pinion 89 is of twice the pitch diameter of the bevelled pinion 88, so that the cam 91 makes one revolution for each two revolutions of the master gear and the gears connecting the master gear with the ring gear 81 are so proportioned that the ring gear makes one cycle of rotation for each revolution of the master gear. The gear 79 is thus held in one shifted position during one revolution of the master gear and is held in the other shifted position during the next revolution of the master gear.

The gear 79 is intermittently driven by the master gear and the shifting mechanism is operated during the time that the gear 79 is out of operative connection with the master gear, so that the shifting of the gear 79 is effected without any clashing of teeth and without throwing any reversing strain on the mechanism. Secured to the shaft 76 is a mutilated gear 98, the pitch circle of which intersects the pitch circle of the master gear 69. As shown in Figure 5, the gear 98 is devoid of teeth over a segment of its periphery and when this segment is contiguous to the master gear 69, operative connection between the two gears is broken. Means are provided for connecting the gear 98 with the gear 69 to cause rotation of the gear 98 at the proper time. The gear 98 is rotated from a position of rest through 360 degrees to a position of rest, and this rotation of the shaft 76 operating through the gear 79 causes the rotation of the ring 36 through a complete cycle. The gear 98 lies in the plane of the master gear 69. Secured to the shaft 76, on one side of the gear 98, is an arm 102 carrying a roller 103, which rolls over a cam 104 on the master gear, the cam 104 being arranged on one side of the gear. Secured to the shaft 76 on the other side of the gear 98 is an arm 105 carrying a roller 106 which is in contact with a cam 107 on the other side of the gear 69. The master gear rotates in the direction of the arrow, as indicated in Figure 5. The cam 107 is provided with an outwardly extending cam portion 108 which, when it moves under the roller 106, causes the shaft 76 to rotate in a counter-clockwise direction. The cam 104 is provided with a depressed portion 109 into which the roller 103 moves as the roller 106 is raised by the cam 108. The depressed portion 109 of the cam 104 carries the roller 103 around with the master gear 69 and brings the teeth of the gear 98 into mesh with the teeth of the master gear. The master gear then directly drives the gear 98 in a counter-clockwise direction for one revolution of the gear 98. The master gear is provided on the same side as the cam 107 with a cam 112, having a depressed portion 113, into which the roller 106 moves as the shaft 76 approaches completion of its revolution. The roller 106 moves into the depression 113 as the teeth on the gear 98 move out of mesh with the gear 69 and the contact between the depressed portion of the cam and the roller carry the roller to the position indicated in Figure 5. The roller 103 engages with the cam 114 on the same side of the gear as the cam 104 and the roller 103 moves down the incline of the cam 114 to the concentric portion 104 of the cam, thus bringing the two rollers 103 and 106 to the neutral position indicated in Figure 5. It is apparent that the cooperation of the rollers and the cams initiate the rotation of the gear 98, bringing it into mesh with the gear 69 and also completes the rotation of the gear 98 after it has moved out of engagement with the gear 69. The shaft 76 is therefore given one revolution for each revolution of the master gear 69. The rotation of the gear 98 is intermittent and occurs during that segment of a revolution of the master gear which occupies the arc between the cams 108 and 114. During the travel of the master gear past the gear 98 from the cam 114 to the cam 108, the shaft 76 remains at rest. The cam 91 is so positioned that the gear 79 is shifted axially to reverse the direction of rotation of the ring 36, during the time that the shaft 76 is at rest and consequently during the time there is no load on the teeth of the connecting gears and during the time that the ring is at rest.

Means are also provided for properly centralizing or positioning the gear 79, so that it may readily be slipped axially into and out of engagement with the gears 84 and 85. Secured to the shaft 83 is a wheel 116, having a V-shaped notch 117 in its periphery which is engaged by a wedge-shaped member 118 which accurately positions the shaft 83. The member 118 is constantly urged from the wheel 116 by a spring (not shown) enclosed in the housing 119. The member 118 is moved into engagement with the V-shaped opening 117 by the cam 121, secured to the shaft 87 of the master gear. A roller 122 on the end of the member 118 engages the cam 121 and the cam is positioned to move the wedge 118 into the notch 117 after the shaft 76 has been disengaged from the master gear and after the wheel 116 has been stopped in approximately neutral position. The wedge 118 centralizes the wheel 116, removing all pressure from the teeth of the driving gears and permits the gear 79 to be slipped axially without interference. The reversing gears 84 and 85, as shown in Figure 2, are arranged on spaced axes with the gears in overlapping relation, so that the gear 79 is moved into engagement with the other of the reversing gears before it is moved out of engagement with the gear with which it has been in mesh.

A clutch member of any suitable construction is arranged between the sprocket 68 and the shaft 71, so that the driving motor may be disconnected from the machine, permitting the machine to be stopped without stopping the motor. The clutch member is provided with a grooved collar 124 which is shifted axially of the shaft 71 by the forked end 125 of the bell crank shifting lever 126 which is fulcrumed on the post 127. The other end of the lever 126 is connected by means of the rod 128, which is connected at its other end to the lever 129 secured to the shaft 131 which is journalled in the frame of the machine and which extends across the machine and projects to the outside of the frame on both sides of the machine. Secured to each end of the shaft 131 is a double-ended pedal 132 which may be rocked in either direction to engage or disengage the clutch. Means are also provided for disengaging the clutch for each rotation of the master gear, although, by holding his foot on the pedal 132 the operator may cause the machine to operate continuously. Secured to the shaft 131 is a lever 133 having an abutment 134 on its end, which, when the clutch is engaged, lies in the path of a roller 135 on the master gear. When, during the rotation of the master gear, the roller 135 is moved into engagement with the abutment 134, the lever 133 is depressed, shifting the clutch lever 126 to cause disengagement of the clutch.

Means are provided for holding the bundle 34 during the time that the wire is being passed around the bundle and being tied, so that the bundle will be tied while clamped in a given position. Slidably mounted in the frame is a vertically disposed bar 137 which extends upward above the bundle and which is pulled downward by the heavy coiled spring 138 anchored at its lower end to the frame and connected at its upper end to the head 139 on the bar. The bar 137 is moved upward and its downward movement is controlled by a cam 141 secured to the shaft 87 on the master gear. Fulcrumed on the shaft 142 is a lever 143 carrying a roller 144 in engagement with the cam 141. The free end of the lever 143 is connected by the link 145 with the vertically movable rod 137, so that the vertical movement of the rod is timed and controlled by the cam 141. The cam is so arranged on the shaft 87 that the bundle is held in position during the binding and tying operation, and when these operations are completed, the bundle is released.

Adjustably secured to the vertically movable bar 137, which is preferably square in cross-section, is a presser foot 147 overlying the table 32. The presser foot is provided with a box 148 surrounding the bar 137 and provided with rollers 149 engaging opposite faces of the bar. Arranged in the box are two clamping jaws 151, having apertures therein through which the bar extends, the jaws being normally pulled together at one end by the spring 152 to bind them to the rod 137. The box 148 and consequently the presser foot 147 are thus firmly secured to the bar 137. The weight of the presser foot and box are substantially counter-balanced by a spring 153 so that when it is desirable to adjust the position of the box on the bar, the spring will relieve the operator of the weight of the presser foot and box. The clamping jaws 151 may be moved from clamping engagement with the bar by spreading apart those ends of the jaws which are pulled together by the spring 152. This is accomplished by means of a cam member 155 formed on the end of the rod 156 extending into the box. The rod is provided with a handle 157 and rotation of the handle spreads apart the jaws 151 and permits the box to be moved relative to the bar.

The back wall 35 is provided with a slot 161 extending therethrough vertically in the plane of the wire carried by the ring 36, to permit the wire to encircle the bundle. At one side of the slot the back wall is formed with a box 162 in which are arranged the devices for gripping and cutting the wire. The means for twisting the overlapping portions of the wire together is located in the slot and will be hereinafter described. In Figures 18, 19 and 20 I have shown the construction of the mechanism contained within the box 162 for gripping and cutting the wire. In Figure 19 I have shown a side view of the box with the back wall 35 removed. Disposed in the box with their heads facing the slot 161 are two gripper dogs 164 and 165, these dogs being spaced apart vertically and lying on opposite sides vertically of the twisting device. Each dog has an overhanging head 166 which is bevelled or tapered at its outer end to facilitate the movement of the wire under the head and is provided with a projection 167 between which and the body of the dog the wire is positioned. The head 166 of the dog overlies a clamping block 168 and the wire is clamped between the head and the block. The dog normally lies in the position indicated in Figures 19 and 20, with the head contained within the box. Means are provided for moving the dog to move the head into the slot so that the wire being passed through the slot is intercepted by the head and is moved into position under the head so that it is clamped as the head recedes to its normal position. The two clamping dogs 164 and 165 are operated at different times. Assuming that the ring 36 is rotating in a clockwise direction, the end of the wire 39 is clamped by the lower dog 165. As the ring rotates, the wire passes upward through the slot 161, around the bundle and again upward into the slot 161 and extends past the upper clamping dog 164. The dog 164 is projected during the time that the wire is moving through the slot the second time and is retracted after the wire has assumed a vertical position in the slot, at which time the wire will underlie the head of the dog. The retraction of the dog 164 will then clamp the other end of the wire. The wire is then twisted and cut off below the gripper 164, another bundle is placed in position and the ring is rotated in a counter-clockwise direction to pass the wire around the positioned bundle. In thus reversing its direction of rotation, the wire is bent over while in contact with and against the head of the dog 164, thus greatly increasing the grip of the dog on the wire. The wire is carried around by the ring in a counter-clockwise direction and extends downward through the slot 161 around the box and again downward through the slot so that there are overlapping portions thereof in the slot. The lower dog 165 then operates to grip the downwardly extending portion of the wire so that the wire encircling the bundle is gripped on opposite sides of the twisting device. The twisting device is then operated, the wire cut off between the dogs and the twisting device and the ring again operated in a clockwise direction to carry the wire around the bundle in such direction. Such reversal of movement of the ring after completion of each tying operation bends the wire around the gripping dog so that the wire is very firmly held by the dog, permitting a maximum of tension to be placed in the wire.

The movement of the gripper head into and out of the slot is controlled by cams 171 and 172 secured to the vertically disposed shaft 173. The shaft 173 is provided on its lower end with a bevel gear 170 which meshes with a bevel gear 180 secured to the shaft 160, the operation whereof will be hereinafter set forth.

The shaft 173, to which the cams 171 and 172 are secured, makes one revolution for each two revolutions of the master gear, or for each two cycles of operation of the ring. Engaging each cam 171—172 is a roller 174 carried by a lever 175 fulcrumed on the shaft 176. The free end of the lever 175 is connected to the gripper dog through heavy cushion springs 177—178, the purpose of the springs being to compensate for different thicknesses of wire. The lever 175 is normally pulled forward, tending to project the head of the gripper dog into the slot, by the coiled spring 179, and the position of the head is controlled by the cam. The cam is shaped to permit the head to move outward slightly to release the small bend of wire held therein, after the operation of the cutter, but without permitting the head to enter the slot and the cam is provided with a further depression which permits the head to extend outward into the slot. When the roller 174 is in contact with the high part of the cam, the head is pulled backward out of the slot, to tightly grip the wire.

Means are also provided in the head for cutting off the wire between the grippers and the twisted tie, to free the tied wire from the remaining wire from the coil. Pivoted in the box 162, on vertical pivots, is a cutter bar 181 having cutters 182 at its ends, which move outward into the slot at the proper time to cut the wire at the end of the tie and to cooperate in ejecting the tie from the twisting device. Formed integral with the cutter-bar 181 is a gear segment 183 which is adapted to be engaged by the gear segment 184 carried by the cross-member 185 secured to the shaft 173. The shaft 173 makes one revolution for each two cycles of operation of the ring and consequently the cutter operating member 185 is provided with two gear segments 184, one of each being operable at the end of a cycle of operation of the ring and wire twisting device. The cutter-bar is normally held in retracted position by the springs 186 and against the stop pin 187', one end of the springs 186 being secured to the box 162 at 187'' and the other end being secured to the pin 187, thus causing the cutter-bar to return to rest against the pin 187' after being acted upon by the gear segment 184 is moved forward into the slot at the proper time to cut the wire. It is understood that the box 162 lies contiguous to the slot 161 through the box wall 35, that the wire in encircling the box is moved through the slot and that the gripper-heads and the cutters are moved into the slot to grip and cut the wires therein. Manifestly, the wire encircling the box is not cut but the wire is cut between the twist and the last gripper to function, so that that portion of the wire that is twisted around the bundle is cut from the remaining wire extending around the ring 36. The cams 171 and 172 for operating the grippers are positioned to operate the grippers at the proper time during the operation of the machine, as has been set forth hereinabove.

The gripper operating shaft 173 is driven by the bevel gear 170, which is in mesh with the bevel gear 180, secured to the shaft 160. Secured to the shaft 160 is a second gear 191 which is in mesh with a gear 192 secured to the shaft 193 which is journalled in the frame. Means are provided for causing the shaft 193 to make one revolution for each revolution of the master gear 69, and the gears 191—192 and 180—160 are so proportioned that the shaft 173 makes one-half revolution for each complete revolution of the master gear. The shaft 193 is rotated at such times during the rotation of the master gear that the grippers are projected and retracted at the proper times during the operation of the machine. In the present construction, for reasons which will hereinafter appear, the shaft 193 is given two half-revolutions during a revolution of the master gear, instead of one whole revolution, but these two half-revolutions perform the same function as one whole revolution. Secured to the shaft 193 are two cross-arms 195 and 196, which are arranged at right angles to each other. Journalled in the end of each cross-arm is a roller, there being two rollers, 201 and 202, on the ends of the cross-arm 195, and two rollers, 203 and 204, on the ends of the cross-arm 196. The axes of these rollers are parallel with the axis of the shaft 193 and the rollers are equidistantly spaced in the concentric circle of their axes. The master gear 69 is provided on its periphery with two cams, one cam lying on each side of the gear. The rollers 201 and 202 lie in the plane of the cam 205 and the rollers 203 and 204 lie in the plane of the cam 206. The two cams are concentric with the axis of the gear 69 over the major portion of their length but are provided at other portions with elevations and depressions into which the rollers associated with the shaft 193 pass. The cam 206 is provided with an elevated portion 207 which is immediately followed by a depression 208, and the cam 205 is provided with a depression 212 which is immediately followed by an elevation 213. As the master gear rotates, the leading roller 201 moves into the depression 212 and the following roller 204 is raised by the elevation 207. This causes a partial rotation of the shaft 193 and brings a segmental gear 214, secured to the shaft 193, into mesh with the master gear 69, causing a half-revolution of the shaft 193. During this half-revolution, the roller 203 engages in the depression 208 of the cam, causing the roller 203 to be moved to the position occupied by the roller 204 in Figure 5. This completes a half-revolution of the shaft 193. Further along, the master gear is provided with another pair of elevations and depressions, which are substantially identical with those which have just cooperated with the rollers and these elevations and depressions in the cam cause the shaft 193 to be given another half-revolution. In the second cam section the elevation 207' corresponds to the elevation 207, the depression 208' corresponds to the depression 208, the depression 212' corresponds to the depression 212, and the elevation 213' corresponds to the elevation 213. The master gear 69 is rotated in the direction of the arrow indicated in Figure 5, bringing the elevations and depressions into operative relation with the rollers, thus causing the shaft 193 to make two half-revolutions during the revolution of the master gear. The second half-revolution of the shaft 193 is effected by the cooperation of the rollers 202 and 203 with the elevations and depressions of the cam and by the segmental gear section 215 which is secured to the shaft 193 and arranged diametrically opposite the gear section 214.

Similar means are provided for rotating the shaft 217, which drives the wire twisting device or knotter. The shaft 217 is provided with cross arms and rollers in the same manner as the shaft 193 and is also provided with segmental gears of the same arrangement, so that the shaft 217 is given two half-revolutions during the rotation of the master gear 69. The rollers associated with the shaft 217 cooperate with the cams 205 and 206 on the master gear and are moved by cooperation with the elevations and depressions thereon, to cause the shaft 217 to make two half-revolutions during the rotation of the master gear. The shaft 217 is so positioned with respect to the positions of the cams on the master gear, that operation of the knotter or wire tying device is effected at the proper time. The cam elements 208 and 213 are formed to cause the initial half-revolution of the shaft 217 to be in excess of 180 degrees. That is, the shaft is caused to rotate in one direction, for instance, 185 degrees and then is rotated backward 5 degrees. This gives the twisting device an over-twist and the back twist relieves the knot of all tension, so that it may readily be removed from the tying or knotting device. The depressed portion 208 of the cam is provided at its end with a slightly elevated portion 218 which extends outward slightly beyond the radius of the concentric portion of the cam 206. The elevated portion 213 of the cam 205, slopes downward to merge into the concentric portion of the cam and is provided with a slight depression 219 immediately in advance of the merging of the inclined portion with the concentric portion. One of the rollers associated with the shaft 217 is raised as it passes over the projection 218 and the other roller is depressed as it passes through the depression 219, thereby causing the rotation of the shaft 217 to be slightly in excess of 180 degrees.

Motion is transmitted from the shaft 217 to the wire twisting device which, in the present instance, comprises a slotted cylindrical member 220. Secured to the shaft 217 is a bevel gear 221, which is in mesh with a bevel gear 222 secured to the vertically disposed shaft 223. The shaft 223 extends upward above the table 32 and secured thereto is a gear 224 which is in mesh with a pinion 225 which is preferably formed integrally with the slotted twisting device 220. The ratio of the gear between the shaft 217 and the twisting device is such that the twisting device is given two and one-half revolutions for each half-revolution of the shaft 217.

The twisting device is rotatable about a vertical axis which is disposed in the slot 161, the twisting device being rotated adjacent the face of the wall 35. Normally the twisting device is disposed in such position that the slot 226 therein opens into the slot 161 in a direction away from the face of the wall 35. In Figure 12, the slot is shown opening toward the face of the wall, but normally the slot is in the diametrically opposed position. In such position the slot 226 forms a continuation of the slot 161, so that as the wire is passed through into the slot 161, as it is being passed around the bundle, it is introduced into the slot 226 in the twisting device. Two portions of the wire are disposed in the narrow portion of the slot 226 so that as the twisting device is rotated these portions are twisted together to form the tie indicated in Figure 14. The twisting device 220 is provided on each side of the slot 226 with larger cavities 227, within which the wire may twist, the width of the narrow portion of the slot being such that the twisting of the wires therein is prevented. Arranged at each end of the twisting device are fixed jaws 228, as shown in Figure 28, through which the overlapping portions of the wire pass. These jaws are provided with slots of substantially the same width as the narrow portion of the slot in the twisting device and the jaws are held stationary, so that when the twisting device is rotated, the twisting of the wire is confined to the space lying between the jaws 228 and the narrow portion of the slot 226, thus causing the formation of the tie shown in Figure 14. Tying pinions, per se, of this general character, are well known and require no further description herein.

The tying device 220 is given substantially two and a half revolutions to form the tie, thus bringing the slot therein into the position indicated in Figure 12, thereby permitting the tie to be readily removed from the slot. After the tie has been removed, the twisting device is given another two and a half revolutions and returned to its normal position, with the slot 226 opening into the slot 161 in a direction away from the bundle. In its twisting rotation, the twisting device is rotated in excess of two and a half revolutions and then is rotated backward for the amount of the excess, to relieve the pressure of the tie in the twisting device, due to the tension of the wire. By overtwisting the wire and then moving the twisting device backward, a position of equilibrium is obtained in which there is no torsional strain in the wire tending to bind the knot or tie in the slot of the twisting device.

Figure 9:
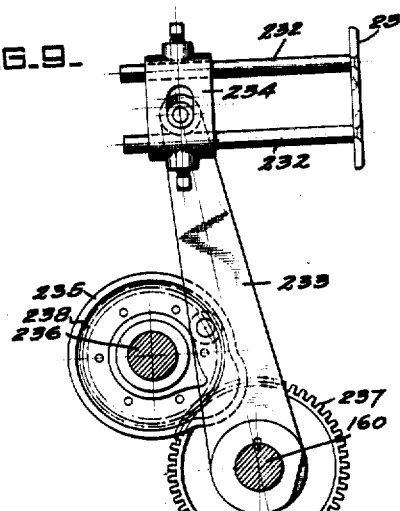
Figure 9 is an elevation of the means employed for pushing the package away from the tying means thereby cooperating to facilitate removal of the tied wire from the tying means.
Figures 15, 16:
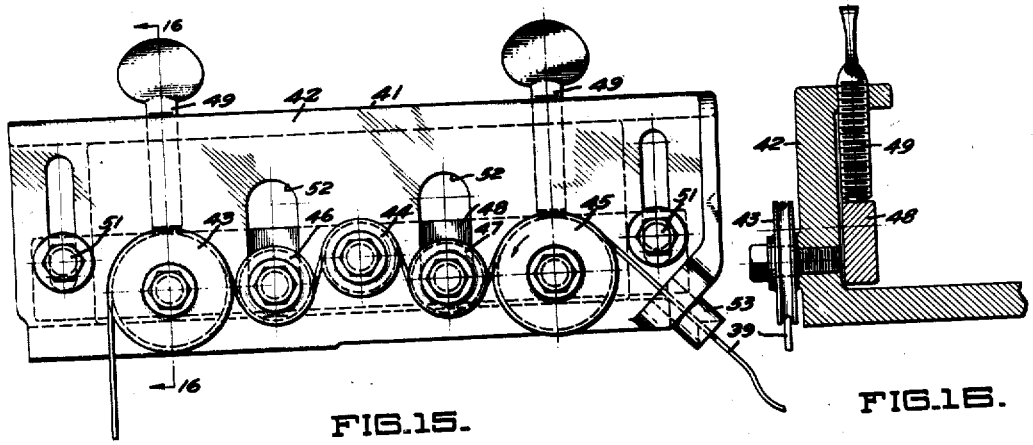
Figure 15 is an elevation of the wire tensioning means.
Figure 16 is a vertical section taken on the line 16—16 Figure 15.
Figure 17:
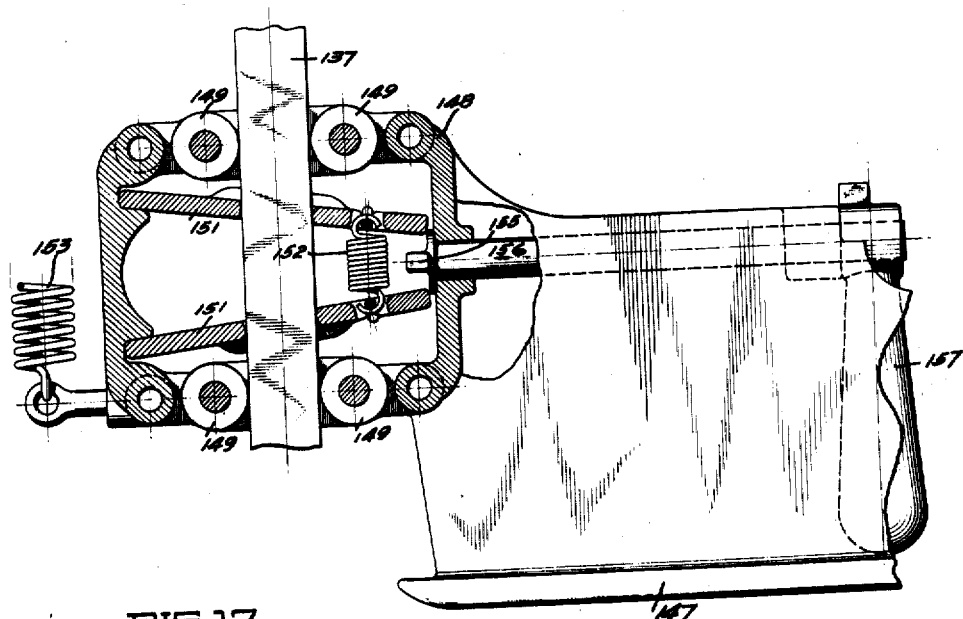
Figure 17 is a vertical section taken through a portion of the presser-foot, showing the means for attaching the foot to the presser-rod.

Arranged in the wall 35, adjacent the slot 161, is a pushed foot 231 as shown in Fig. 9 which is adapted to be moved forward to push the bundle away from the back wall and consequently permit the cutters, upon continued movement after severing the wire, to remove the tie from the tying device. The plate 231 is secured to the rods 232 slidable in bearings in the wall and the rods 232 are moved to push the plate against the bundle, by the lever 233 which is connected to the cross-head 234 secured to the rods. The lever 233 is loosely fulcrumed on the shaft 160 and is operated by the cam 235. The cam 235 is fixed to a gear 238 which is rotatably mounted on a fixed shaft 236. The gear 238 meshes with gear 237 which is fixed on shaft 160, and is rotated once for each revolution of the master gear.

In operation, the machine comes to rest after one of its cycles of operation, in the position indicated in Figure 1, with the end of the wire extending inward from the ring being gripped by the upper gripper 164. The ring is then rotated in a counter-clockwise direction, feeding the wire around the box in a counter-clockwise direction. The twisting device is in its normal position in the slot 161. As the ring 36 starts to rotate in a counter-clockwise direction, the end of the wire is bent around and against the gripper 164 and the wire is passed into the slot 161 and into the slot 226 of the twister. The wire is then carried around the bundle, while being held under tension, and is brought around so that a second strand of the wire passes into the slot 161 and into the slot 226. This portion of the wire is then gripped by the lower gripper 165 and the twisting means is then operated to form the knot. At the end of this operation, the slot 226 faces the bundle 34 and the cutters are operated to sever the wire tied around the bundle from the remaining wire extending around the ring 36 as well as the small waste piece of wire just released by the gripper 164. The cutters eject the knot from the tying device as well as the small waste piece of wire which falls between the wall 35 and the package 34 which was simultaneously pushed away by the pusher foot 231. The tying device is then given another two and a half revolutions to bring it back to normal position. Another bundle is then placed and the machine operated another time, this time the ring rotating in a clockwise direction to pass the tensioned wire around the bundle in such direction. However, should it be desired to place more than one binding about the same bundle or object, this can be readily done by holding the bundle in different locations relative to the plane of the ring; and the ring, rotating in a direction opposite to that in which it rotated for placing one binding about the bundle, will again effect encircling of the binding strip to provide another binding. It is thus seen that the ring, of the preferred machine, rotates in opposite directions for successive binding or encircling operations, regardless of whether the bindings are placed about the same object or about different objects. During the time that the wire is being passed around the bundle, the bundle is held in fixed position by the clamp 147. The tension on the wire causes tight wrapping of the wire around the bundle and, due to the operation of the tying device which substantially eliminates the production of slack in the wire, the finished tie tightly encircles the bundle. In this connection, it is to be observed that the two closely positioned rollers 38 on the ring, which form a lead-off guide member for the wire, are interposed between the grippers and the wire tensioning source. The member contacts the wire to flex it away from the bundle and in the plane of the winding during its entire orbital movement about the bundle. This, coupled with the tension on the wire, will cause convex flexing thereof and thereby result in the wire tightly hugging the sides of the bundle.

By the expression "wire" is meant any suitable binding strip, whether rectangular or round, or otherwise in cross section.

I claim:

1. In a bundle tying machine, means for supporting a bundle in a fixed location, means including an annular member for passing a tensioned wire around the located bundle so that the wire tightly encircles the bundle, with one portion of the wire overlapping another portion of the wire in a plane substantially parallel to the plane of a side of the bundle, and means for twisting together the overlapping portions of the wire.

2. In a bundle tying machine, means for supporting a bundle in a fixed location, means for passing a wire around the fixedly located bundle with one portion of the wire overlapping another portion of the wire, said overlapping portions being parallel and being disposed in a vertical plane parallel to a side of the bundle at the side of the bundle and means for twisting together the overlapping portions of the wire.

3. In a bundle tying machine, bundle supporting means, a rotatably mounted ring surrounding said supporting means, means for rotating the ring in opposite directions and means carried by the ring for passing a wire around the bundle for either direction of rotation of the ring.

4. In a bundle tying machine, bundle supporting means, a rotatably mounted ring surrounding said supporting means, means for rotating the ring alternately in opposite directions and means carried by the ring for passing a wire around the bundle for either direction of rotation of the ring.

5. In a bundle tying machine, bundle supporting means, a rotatably mounted ring surrounding said supporting means, means carried by the ring for passing a wire around the bundle, means for rotating the ring through a cycle in one direction, means for stopping the rotation of the ring at the end of the cycle and means for simultaneously reversing the driving connections of the ring so that in the next cycle of operation the ring will be rotated in the opposite direction.

6. In a bundle tying machine, bundle supporting means, a rotatably mounted ring surrounding said supporting means, means carried by the ring for passing a wire around the bundle, a wire tying means constrained with respect to said support and through which the wire is passed twice in one direction by the rotation of the ring and thereby overlapped and means for rotating said tying means to twist the overlapping portions of the wire together.

7. In a bundle tying machine, a frame adapted to support the bundle to be tied, a ring rotatably mounted in said frame and adapted to surround the bundle, a wire twisting means arranged on said frame contiguous to one side of the bundle, means on the ring for passing a wire around the bundle and twice in the same direction through the twisting means and means for rotating the twisting means to twist the two portions of the wire therein together.

8. In a bundle tying machine, a frame adapted to hold the bundle to be tied, a slotted wall on said frame against which the bundle is placed, a slotted wire twisting device arranged in said slot alongside of said bundle with the slot in the device parallel to the contiguous side of the bundle, means for passing a wire around the bundle and overlapping portions thereof in the slot of the twisting device and means for rotating the twisting device to tie the wire around the bundle.

9. In a bundle tying machine, a frame adapted to hold the bundle to be tied, a slotted wall on said frame against which the bundle is placed, a slotted wire twisting device in said slot along side of the bundle, the slot in said device being parallel to the contiguous side of the bundle, a rotatable ring surrounding said wall, means on the ring adapted to pass a wire around the bundle and overlap ends of the wire in the slot of the twisting device and means for rotating the twisting device to twist the overlapping ends together.

10. In a bundle tying machine, a frame adapted to hold the bundle to be tied, a slotted wire twisting device arranged contiguous to the side of the held bundle, the slot in the twisting device being parallel to the contiguous side of the bundle whereby the twisted wire will lie parallel to the contiguous side, means for passing a wire around the bundle and twice in the same direction through said slot, whereby the portions of the wire disposed in the slot are overlapped and means for rotating the twisting device to twist the overlapping portions of the wire together.

11. In a bundle tying machine, a support for the bundle, a slotted wire twisting device arranged adjacent said support, the slot in said device being parallel to the contiguous side of the bundle and normally opening away from said bundle, means for passing a wire into the slot, around the bundle and again into the slot, in the same direction to overlap the portions of the wire disposed in the slot, and means for rotating the device a whole and a fractional number of times to twist the overlapping portions of the wire together and to position the device with the slot opening toward the contiguous side of the bundle.

12. In a bundle tying machine, a slotted wire twisting device, means for inserting into said device portions of the wire encircling the bundle so that said portions overlap, the said device being normally positioned with the slot opening away from the bundle, means for rotating the device a whole and a fractional number of times to form a twist of the overlapping portions and halt the device with the slot opening toward the bundle and means for ejecting the twist from the slot.

13. In a bundle tying machine, means for supporting the bundle, a slotted wire twisting device arranged adjacent said support with the slot opening away from the bundle, means for passing a tensioned wire around the bundle and twice thru said slot in the same direction to overlap the portions of the wire disposed in the slot, means for rotating the twisting device a whole and a fractional number of turns to form a twist of the overlapping portions of the wire and halt the device with the slot opening toward the bundle, and means for ejecting the twist from the slot.

14. In a bundle tying machine, means for supporting the bundle, a slotted wire twisting device arranged adjacent the support with the slot opening away from the bundle, means adjacent one end of the slot for gripping the end of a wire, means for passing the wire into the slot, around the bundle and again into the slot whereby portions of the wire are overlapped in the slot, means adjacent the other end of the slot for gripping the encircling wire, means for rotating the twisting device a whole and a fractional number of times to form a twist of the overlapping portions of the wire and halt the twisting device with the slot opening toward the bundle and means for cutting the wire between the twist and the gripping means.

15. In a bundle tying machine, means for supporting the bundle, a slotted wire twisting device arranged adjacent the support with the slot opening away from the bundle, means adjacent one end of the slot for gripping the end of the wire, means for passing the wire into the slot, around the bundle and again into the slot so that portions of the wire overlap, means adjacent the other end of the slot for gripping the encircling wire, means for rotating the twisting device a whole and a fractional number of times to form a twist of the overlapping portions of the wire and halt the twisting device with the slot opening toward the bundle, means for cutting the wire between the twist and the gripping means and means for ejecting the twist from the slot.

16. In a bundle tying machine, means for supporting a bundle, a slotted wire tying device arranged adjacent a side of the supported bundle with the slot opening away from the side of the bundle, means for passing a wire around the bundle and twice through the slot in one direction to overlap portions of the wire disposed in the slot, means for rotating the device in one direction to twist the overlapping portions together and in the opposite direction to relieve the tension in the twist, the total rotation of the device being such that the device is brought to rest with the slot opening toward the side of the bundle.

17. In a bundle tying machine, means for supporting the bundle to be tied, a rotatably mounted ring surrounding said support, means carried by the ring for passing a wire around the bundle, driving means for alternately rotating the ring in opposite directions whereby the wire is passed in opposite directions for successive rotations of the ring, and means for maintaining the wire taut during both directions of rotation of the ring.

18. In a bundle tying machine, means for supporting the bundle to be tied, a rotatably mounted ring surrounding said support, means carried by the ring for passing a wire around the bundle, a motor for driving said ring, a reversing mechanism interposed between the motor and the ring and means operative upon the completion of a tying operation for operating the reversing mechanism whereby the ring rotates in the opposite direction.

19. In a bundle tying machine, means for supporting the bundle to be tied, a rotatably mounted ring surrounding said support, means carried by the ring for passing a wire around the bundle, a motor for driving the ring, a clutch and a reversing mechanism interposed between the motor and the ring, means operative upon the completion of a tying operation for disengaging the clutch and means operative upon the completion of a tying operation for operating the reversing mechanism.

20. In a bundle tying machine, means for supporting the bundle to be tied, a rotatably mounted ring surrounding said support, means carried by the ring for passing a wire around the bundle, said ring being movable from initial position through an arc to another initial position, a motor for driving said ring, a clutch interposed between the motor and the ring, means operative upon the arrival of the ring at said second initial position for disengaging the clutch, a reversing gear interposed between the clutch and the ring, means operative by the further rotation of the motor for actuating said reversing gear and means for positioning the ring in said second initial position.

21. In a bundle tying machine, a rotatably mounted ring for passing a wire around a bundle, a motor for rotating said ring, a pair of reversing gears, a driving gear movable alternately into engagement with the reversing gears to reverse the direction of rotation of the ring, means for shifting the driving gear and means for disconnecting the driving gear from the motor in advance of the operation of said shifting means.

22. In a bundle tying machine, a rotatably mounted ring for passing a wire around a bundle, a motor for rotating said ring, a pair of reversing gears, a driving gear movable alternately into engagement with the reversing gears to reverse the direction of rotation of the ring, means for shifting the driving gear, means for disconnecting the driving gear from the motor and means for positioning the teeth on the reversing gears in meshing relation with the teeth on the driving gear in advance of the operation of the shifting means.

23. In a bundle tying machine, a rotatably mounted ring for passing a wire around a bundle, a motor for rotating said ring, a master gear driven by said motor, a driving shaft connected to the ring, said shaft being normally disconnected from the master gear and means actuated by the rotation of the master gear for connecting said shaft to the master gear.

24. In a bundle tying machine, a rotatably mounted ring for passing a wire around a bundle, a driving motor, a master gear driven by said motor, a driving shaft connected to the ring, a mutilated gear on said shaft normally out of engagement with the master gear and means actuated by the rotation of the master gear for moving said mutilated gear into mesh with the master gear.

25. In a bundle tying machine, a rotatably mounted ring for passing a wire around a bundle, a motor, a master gear driven by said motor, a driving shaft, a mutilated gear on said shaft adapted to be moved into mesh with the master gear and to become disengaged from the motor gear upon predetermined rotation of the mutilated gear, reversing gearing interposed between the ring and the driving shaft and means driven in time with the master gear for reversing said gearing while the mutilated gear is out of mesh with the master gear.

26. In a bundle tying machine, means for passing a wire around the bundle to be tied, a device adapted to be rotated to twist together overlapping portions of the wire, a master gear for driving said means and device and means on the master gear for determining the time of operation of the twisting device with respect to the operation of the means for passing the wire around the bundle.

27. In a bundle tying machine, means for passing a wire around the bundle to be tied, a device adapted to be rotated to twist together overlapping portions of the wire, means for cutting the wire at the ends of the twisted portion, a motor for driving said means and device, a master gear disposed between the motor and the means and device and means carried by the master gear for connecting said means and devices to and disconnecting them from the master gear.

28. In a bundle tying machine, means for passing a wire around the bundle to be tied, a wire twister in which overlapping portions of the wire are disposed, wire grippers arranged at opposite sides of the twister, a master driving gear normally disconnected from said wire passing means, twister and gripper, and means actuated by the rotation of the master gear for successively connecting said wire passing means, twister and gripper to said gear.

29. In a bundle tying machine, means for passing a wire around the bundle to be tied, a wire twister in which overlapping portions of the wire are disposed, wire grippers arranged at opposite sides of the twister, a master driving gear normally disconnected from said wire passing means, twister and gripper, cams on said master gear and devices actuated by said cams during the rotation of the master gear for connecting the wire passing means, the twister and the grippers to said gear.

30. In a bundle tying machine, a rotatably mounted ring adapted to be rotated in one direction to pass a wire around a package, wire twisting means in which overlapping portions of the wire are disposed, a gripper arranged to engage the wire of the overlapping portion adjacent the twister, means for cutting the wire between the gripper and the twister and means for rotating the ring in the opposite direction after cutting of the wire, the reverse movement of the ring serving to bend the wire around the gripper.

31. In a bundle tying machine, means for passing a wire in one direction around a bundle, a gripper for clamping the wire after it has passed around the bundle, means for tying the wire passed around the bundle, means for cutting the tied portion of the wire from the wire and means for reversing the direction of movement of the wire passing means to pass a wire around another bundle in the opposite direction, the reversal of the direction of movement of said means serving to bend the wire around and in contact with the gripper.

32. In a bundle tying machine, means for effecting passing of wire in one direction about an object to be tied, means for gripping the wire at the end of its movement around the bundle and means for subsequently passing the wire in the opposite direction whereby the wire is bent over and against the gripping means.

33. In a bundle tying machine, a wire gripper, means for operating the gripper to clamp the wire, means for passing the wire around the bundle in a direction to bend it around and against the gripper and means for holding the wire in tension.

34. In a bundle tying machine, a wire feeding ring, means for alternately rotating the ring in opposite directions to pass the wire around successive bundles in opposite directions, means operative at the end of each rotation of the ring for twisting overlapping portions of the wire together to tie the wire around the bundle and means for cutting the tied portion of the wire from the wire.

35. In a bundle tying machine, means for supporting the bundle, a presser foot arranged above the supporting means, a spring tending to depress said foot and means for moving the foot in opposition to the spring.

36. In a bundle tying machine, means for supporting the bundle, a presser foot arranged above the supporting means, a bar to which said foot is adjustably clamped, a spring tending to depress said bar, means for passing a wire around the bundle, a gear for driving said means and means driven by said gear for controlling the downward movement of the presser foot.

37. In a bundle tying machine, a table for supporting the bundle, a back wall on said table against which the bundle is placed, said wall being provided with a vertical slot, a rotatably mounted wire feeding ring surrounding said table and wall and arranged to pass a wire around the bundle, means in the slot for twisting together overlapping ends of the wire, said means being normally positioned to receive overlapping portions of the wire as it is passed around the bundle, means for rotating said twisting means, grippers in said slot for gripping the ends of the wire adjacent the overlap, means for cutting the wire between the twisted portion and the grippers and means for ejecting the twist from the twisting means.

38. In a bundle tying machine comprising a rotatably mounted ring for passing a wire around the bundle, means for alternately rotating said ring in opposite directions comprising a motor, a gear continuously driven in one direction thereby, a gear from which the ring is rotated, and means connected with the former gear for rotating the latter gear alternately in opposite directions.

39. In a bundle tying machine, means for supporting the bundle, a reciprocating rod, a presser foot on said rod, a spring for urging said rod to move said presser foot to clamp said bundle on said supporting means, and a friction connection between said rod and said presser foot unyielding under the influence of said spring.

40. In a bundle tying machine, a rotatable ring for passing a wire around a bundle, a source of continuous rotary motion, and means connecting said source of continuous rotary motion to said ring for alternately rotating said ring in opposite directions.

41. A machine of the class described comprising, in combination, mechanism surrounding the object to be bound for guiding and laying a band completely around said object during each cycle of movement in one direction; and means actuating said mechanism alternately in opposite directions to effect binding of the objects alternately in opposite directions.

42. A machine of the class described comprising, in combination, a bundle support; an annular bundle-binding member surrounding the bundle support; and driving means for said member rotating it alternately in opposite directions to effect binding of the bundles alternately in opposite directions.

43. A machine of the class described comprising, in combination, a bundle support; an annular bundle-binding member surrounding the bundle support; driving means for said member rotating it alternately in opposite directions with an interval of rest; and a wire tying mechanism operable during said interval of rest to unite the wire strands.

44. A machine of the class described comprising, in combination, mechanism for binding an object with a strand of wire; said binding mechanism operating alternately in opposite directions to effect binding of the objects alternately in opposite directions; and wire tying mechanism positioned within the path of travel of the wire to unite the wire at the completion of each binding operation.

45. A machine of the class described comprising, in combination, a bundle-binding member; wire tying mechanism; the bundle binding member being constructed and arranged to place a wire completely around a bundle and to overlap the wire within the tying mechanism; and means for operating the bundle binding member in opposite directions.

46. A machine of the class described comprising, in combination, a rotary bundle binding member; wire tying mechanism; the bundle binding member being constructed and arranged to place a wire completely around a bundle and to overlap the wire within the tying mechanism; and means to rotate the bundle binding member alternately in opposite directions.

47. A machine of the class described comprising, in combination, means for securing one end of a wire; and a rotary bundle binding member constructed and arranged to lay a wire strand whose end is thus held completely around a bundle successively in contact with the faces thereof and to overlap the extremities of the wire in a vertical plane, said bundle binding member completely enclosing the bundle with wire without the aid of wire clamping means holding the wire against the bundle.

48. A machine of the class described comprising, in combination, a rotary bundle-binding member constructed and arranged to lay a wire strand completely around a bundle to provide overlapping strands for forming the tie; means for operating the bundle binding member in opposite directions; and means positioned within the path of travel of the wire to unite the overlapping extremities of the wire after binding the bundle.

49. A machine of the class described comprising, in combination, a bundle support; a rotary bundle-binding mechanism; means rotating the bundle-binding mechanism through more than one revolution in each cycle to encompass a bundle with wire and to provide overlapping wire strands in a vertical plane for formation of the tie; and wire tying mechanism.

50. A machine of the class described comprising, in combination, a bundle support; rotary bundle-binding mechanism operating to bind a supported bundle with wire; means rotating said mechanism through more than one revolution alternately in opposite directions to encompass a bundle with wire to provide overlapping strands in a vertical plane for formation of a tie; and wire tying mechanism to unite said overlapped strands at the completion of each cycle of movement of the binding mechanism.

51. A machine of the class described comprising, in combination, a rotary reversible bundle-binding member; wire tying mechanism; and wire-end gripping means in duplicate arranged near the tying mechanism and operable alternately to grip the wire before each binding operation.

52. A machine of the class described comprising, in combination, a bundle support; a bundle-positioning abutment; means for holding one end of the wire adjacent the abutment-positioned face of the bundle; and a rotary bundle-binding member movable completely around the bundle for laying a wire successively in contact with the faces of the bundle to bind the same.

53. A machine of the class described comprising, in combination, a bundle support; wire end gripping means adjacent one side of the support; rotatable bundle-binding means surrounding the support to place a wire about the sides of the bundle successively, to lie in contact with said sides without the aid of wire clamping mechanism holding the wire against the bundle; and wire tensioning means maintaining a substantially uniform tension on the wire.

54. A machine of the class described comprising, in combination, a rotary annular bundle-building member; means on said member for guiding and supporting the wire; wire tying mechanism including a rotary slotted twister; and means to grip one end of the wire mounted near the tying mechanism; said wire guiding and supporting means holding the wire spaced from all parts of the bundle until the wire has been carried into the slotted twister.

55. A machine of the class described comprising, in combination, a bundle support; bundle-binding means; wire tying means surrounded by the bundle-binding means; and a bundle positioning abutment to permit placing the bundle close to the tying means and having a passageway for the wire; the parts being constructed and arranged to discharge the tied wire through said passageway.

56. A machine of the class described comprising, in combination, an annular binding member having wire guiding means spaced therearound and constructed and arranged to lay a wire around a bundle upon actuation of the member; wire tying means including a rotary slotted twister encircled by said member and constructed and arranged to receive tie strands of the wire from said member in overlapping relation; means for rotating said twister to form a tie with said strands; and means for discharging the tie sidewise toward the bundle.

57. A machine of the class described comprising, in combination, mechanism surrounding the object to be bound for guiding and laying a band completely around said object during each cycle of movement in one direction; and means activated independently of any contact with the bundle for actuating said mechanism alternately in opposite directions to effect binding of the objects alternately in opposite directions.

58. A machine of the class described comprising, in combination, a bundle support; an annular bundle-binding member surrounding the bundle support; driving means for said member activated independently of any contact with the bundle for rotating said member alternately in opposite directions to effect binding of the bundles alternately in opposite directions.

59. A machine of the class described comprising, in combination, an annular bundle-binding member; a slotted rotary twister; the bundle binding member being constructed and arranged to place a wire completely around a bundle and to overlap the wire within the slot of the twister; and means activated independently of any contact with the bundle for rotating the bundle-binding member in opposite directions.

60. A machine of the class described comprising, in combination, mechanism for guiding and laying a wire band completely about a bundle in one cycle of movement; means for tying the band so laid; and driving means activated independently of any contact with the bundle for effecting reversal of the band-guiding and laying mechanism to enclose a second bundle with a band in the opposite cycle of movement.

61. A machine of the class described comprising, in combination, spaced bundle supporting elements; a slotted rotary twister; an annular bundle-binding member movable in a vertical plane intermediate said elements; the bundle binding member being constructed and arranged to place a wire completely around a bundle placed in binding position on said supports and to overlap the wire within the slot of the twister; and means activated independently of any contact with the bundle for rotating the bundle-binding member in opposite directions.

62. In a tying machine, means for effecting encircling of a tensioned binding wire about an object to be bound and tied, said means including an annular member, and means for securing the wire in a substantially flat joint.

63. In a tying machine, means for effecting encircling of a binding wire about an object to be bound and tied, said means including a rotatable annular member adapted to surround the object, and means for securing the wire in a substantially flat joint.

64. In a tying machine, means for supporting an object to be bound and tied in a fixed location, means for winding a binding wire about the fixedly located object, said means including a rotatable annular member adapted to surround the object, and means for securing the wire in a substantially flat joint.

65. In a tying machine, means for effecting encircling of a binding wire about an object to be tied, said means including a rotatable wire guiding ring movable in a path about the object, and means for securing the wire in a substantially flat joint.

66. In a tying machine, a rotatable annular member mounted for movement to describe a path around an object to be tied, means for supplying a binding wire to said member, means for clamping the wire adjacent the object, means for rotating the member to effect encircling of the clamped wire about the object, and means for securing the wire in a substantially flat joint.

67. In a tying machine, a wire guiding ring rotatable about an object to be tied, means for supplying a binding wire to said ring, means for clamping the wire adjacent the object, means for rotating the ring in one direction to effect encircling of the clamped wire about the object, means for securing the wire, and means for rotating the ring in an opposite direction.

68. In a wire tying machine, a wire guiding ring rotatable to describe a path encircling an object to be tied, means for supplying wire under tension to said ring, means for rotating the ring to effect encircling of the wire about the object so that one portion of the wire overlaps another portion thereof in a plane substantially parallel to the adjacent surface of the object, and means for intertwisting the overlapped portions to provide a substantially flat joint.

69. In a wire tying machine, a wire guiding ring rotatable to describe a path encircling an object to be tied, means for supplying wire under tension to said ring, means for rotating the ring to effect encircling of the wire about the object so that one portion of the wire overlaps another portion thereof in a plane substantially parallel to the adjacent surface of the object, and means located within the periphery of said ring for intertwisting the overlapped portions to provide a substantially flat knot.

70. In a wire tying machine, a rotatable ring, means for supplying wire to said ring, said ring having a wire lead-off member movable orbitally about an object to be tied upon rotation of the ring, means for rotating the ring to effect encircling of the wire about the object, and means for intertwisting adjacent portions of the wire into a substantially flat knot.

71. In a wire tying machine, a ring rotatable about an object to be tied, means for supplying wire to said ring, means for rotating the ring to effect encircling of the wire about the object so that one portion of the wire overlaps another portion thereof in a plane substantially parallel to the adjacent surface of the object, means for intertwisting the overlapped portions to provide a substantially flat knot, and means for rotating the ring in an opposite direction.

72. In a tying machine, a ring rotatable about its axis, means for supplying a binding wire to said ring, and means for mounting said ring to allow rotation in opposite directions.

73. In a wire tying machine, a ring rotatable in one direction to effect winding of wire about an object to be tied, means for rotating the ring in an opposite direction for another winding operation, and a single securing means for tying the wire in either direction of winding thereof.

74. In a wire tying machine, means for forming a substantially flat knot in wire wound about an object, a pair of wire clamping members between which said means is located, a ring rotatable in opposite directions for effecting winding of wire about objects in either direction of rotation, and means for correlating the operation of the clamping members in accordance with the direction of winding of the wire.

75. In a wire binding and tying machine, a ring rotatable in opposite directions for effecting encompassing of objects by wire, means for supplying wire to said ring, means for tensioning the wire, a pair of spaced clamping members, means for conditioning said clamping members for clamping the wire when the ring is rotated in one direction, means for conditioning said clamping members when the ring is rotated in an opposite direction, wire securing means located between said spaced clamping members, and means for correlating the operation of the clamping members, ring and securing means in timed relationship.

76. In a wire tying machine, means for forming a knot in wire wound about an object, a pair of wire clamping members between which said means is located, a rotatable ring for effecting winding of wire about an object, means for rotating the ring in opposite directions, and means for correlating the operation of the clamping members in accordance with the direction of rotation of the ring.

77. In a wire tying machine, a rotatable annular member for effecting encircling of wire about an object to be bound and tied, means for supplying wire under tension to said member, means for rotating the member more than a revolution in one direction to overlap portions of the encircled wire in a plane substantially parallel to the adjacent surface of the object, means for twisting together said portions to form a flat knot, and means for reversing the direction of rotation of said member after formation of the knot.

78. In a bundle tying machine, a wire gripper comprising a head and a projection thereon, means for operating the gripper to clamp the wire, means for passing the wire around the bundle in a direction to bend it around and against said projection, and means for holding the wire in tension.

79. In a wire tying machine, a clamping block, a wire gripper movable relative to said block and comprising a head and a projection thereon, means for operating the gripper to hold the wire between the projection and the block, and means for passing the held wire around an object in a direction to bend it around and in contact with said projection.

80. In a wire tying machine, a rotatable ring for effecting winding of wire about an object to be bound and tied, means for mounting the ring to allow rotation in reverse directions, and means for maintaining the wire taut when the direction of rotation of the ring is reversed.

81. In a wire tying machine, a rotatable ring for effecting winding of wire about an object to be bound and tied, means for mounting the ring to allow rotation in reverse directions, means for guiding wire along the periphery of said ring, and means for maintaining the wire taut when the direction of rotation of the ring is reversed.

82. In a wire tying machine, a rotatable ring, a slotted twister within the ring for forming a flat knot from overlapped portions of wire, means for supplying wire to said ring, and means for rotating the ring to effect encircling of the wire about an object to be bound and tied and to overlap portions of said wire in the slot of the twister.

83. In a wire tying machine, a rotatable ring, a slotted twister positioned within the ring and substantially in the plane of the ring for forming a flat knot from overlapped portions of wire, means for supplying wire to said ring, and means for rotating the ring to effect encircling of the wire about an object to be bound and tied and to overlap portions of the wire in the slot of said twister.

84. In a wire tying machine, a rotatable ring, a slotted twister, positioned within the ring and substantially in the plane of the ring for forming a flat knot from overlapped portions of wire, said twister being also mounted in an upright position whereby the overlapped portions will lie in a substantially vertical plane, means for supplying wire to said ring, and means for rotating the ring to effect encircling of the wire about an object to be bound and tied and to overlap portions of the wire in the slot of the twister.

85. In a tying machine, means for effecting encircling of a tensioned binding wire about an object to be bound and tied, and a member having means to receive portions of said wire in one position, said member being movable to intertwist said portions and place them for discharge in another position.

86. In a tying machine, means for supporting an object to be bound and tied, means for effecting encircling of a binding wire about the object with portions of the wire overlapping; and a slotted twister for receiving the overlapped portions in one position, said twister being movable to intertwist said portions and place them for discharge in another position.

87. In a tying machine, means for supporting an object to be bound and tied, means for effecting encircling of a binding wire about the object with portions of the wire overlapping, a rotatable twister having a slot opening away from the object to receive the overlapped portions, and power operated means for rotating the twister to intertwist said portions and to position said slot toward the object for discharge of the twisted portions.

88. In a tying machine, means for supporting an object to be bound and tied, means for effecting encircling of a binding wire about the object with portions of the wire overlapping in a plane substantially parallel to the adjacent surface of the object, a rotatable twister adjacent the object and having a slot opening away from the object to receive the overlapped portions, means for rotating the twister to intertwist said portions and to position said slot toward the object for discharge of the twisted portions, and means for effecting removal of the object from adjacent the twister upon completion of the twisting operation.

89. In a tying machine, means for supporting an object to be bound and tied, means for effecting encircling of a binding wire about the object with portions of the wire overlapping in a plane substantially parallel to the adjacent surface of the object, a rotatable twister adjacent the object and having a slot opening away from the object to receive the overlapped portions, means for rotating the twister to intertwist said portions and to position said slot toward the object for discharge of the twisted portions, means for clamping the wire adjacent each end of the twister during the twisting operation, and means for severing the encircled and twisted portions of the wire from the remainder thereof.

90. In a tying machine, means including a rotatable ring for effecting encircling of a binding wire about an object to be bound and tied; a rotatable twister within said ring and having a slot opening toward the periphery of the ring to receive overlapped portions of the wire, and means for rotating the twister to intertwist said portions and to position said slot toward the center of the ring for discharge of the twisted portions.

91. In a tying machine, means for supporting an object to be bound and tied, means for effecting encircling of a binding wire about the object with portions of the wire overlapping, a slotted twister for receiving the overlapped portions, said twister being movable in a direction to intertwist said portions, and means for mounting said twister to allow reverse movement for relieving tension on the twist.

92. In a tying machine, means for supporting an object to be bound and tied, means for effecting encircling of a binding wire about the object with portions of the wire overlapping, a slotted twister for receiving the overlapped portions, and power operated means for moving the twister in a direction to intertwist said portions and then in a reverse direction to relieve tension on the twist.

93. In a tying machine, means for supporting an object to be bound and tied, means for effecting encircling of a binding wire about the object with portions of the wire overlapping in a plane substantially parallel to the adjacent surface of the object, a twister having a slot opening away from the object to receive said overlapped portions, and means for rotating the twister to intertwist said portions and to position said slot for discharge of the twisted portions toward the object, said means including means for imparting to the twister a reverse movement to relieve tension on the twist.

94. In a binding machine, means for clamping a binding wire, means for tensioning said wire, means for effecting encircling of the clamped and tensioned wire about an object to be bound, and means intermediate the clamping and the tensioning means for effecting tight hugging of the wire against the object.

95. In a binding machine, means for clamping a binding wire, means for tensioning the wire, means including a rotatable ring for effecting encircling of the clamped and tensioned wire about an object to be bound, and means on the ring for holding the wire adjacent the periphery thereof, said latter means including a wire lead-off member intermediate the clamping and tensioning means for effecting tight hugging of the wire against the object.

96. In a binding machine, means for clamping a binding wire, means for tensioning the wire, and wire guide means interposed between the clamping and the tensioning means and movable orbitally to effect winding of the wire about an object to be bound, said guide means being positioned to contact the wire so as to flex the wire away from the object and in the plane of the winding.

97. In a binding machine, means for clamping a binding wire, means for tensioning the wire, and wire guide means interposed between the clamping and the tensioning means and movable orbitally to effect winding of the wire about an object to be bound, said guide means being positioned to contact the wire so as to flex the wire away from the object and in the plane of the winding during its entire orbital movement about the object, and means for orbitally moving the guide means in opposite directions.

98. In a binding machine, means for supporting an object to be wound with wire, and means for effecting winding of the wire about the object and in a predetermined plane, including means contacting said wire for flexing it away from the object and in the plane of the winding throughout the entire winding operation.

99. In a binding machine, means for supporting an object to be wound with wire, means for effecting winding of the wire about the object and in a predetermined plane, including means contacting said wire for flexing it away from the object and in the plane of the winding throughout the entire winding operation, and means for moving said wire contacting means in opposite directions.

In testimony whereof, I have hereunto set my hand.

GEORGE D. PARKER.

DISCLAIMER 1,875,260.—*George D. Parker*, Riverside, Calif. BUNDLE BINDING AND TYING MACHINE. Patent dated August 30, 1932. Disclaimer filed December 18, 1939, by the assignee of one-half interest, *Wire Tie Machinery Company*.

Hereby enters this disclaimer to claims 38, 40, 52, 53, 55, 67, 72, 80, 81, 94, 95, 96, 97, 98, and 99 of said Letters Patent.

[*Official Gazette January 16, 1940.*]

clamping a binding wire, means for tensioning the wire, and wire guide means interposed between the clamping and the tensioning means and movable orbitally to effect winding of the wire about an object to be bound, said guide means being positioned to contact the wire so as to flex the wire away from the object and in the plane of the winding.

97. In a binding machine, means for clamping a binding wire, means for tensioning the wire, and wire guide means interposed between the clamping and the tensioning means and movable orbitally to effect winding of the wire about an object to be bound, said guide means being positioned to contact the wire so as to flex the wire away from the object and in the plane of the winding during its entire orbital movement about the object, and means for orbitally moving the guide means in opposite directions.

98. In a binding machine, means for supporting an object to be wound with wire, and means for effecting winding of the wire about the object and in a predetermined plane, including means contacting said wire for flexing it away from the object and in the plane of the winding throughout the entire winding operation.

99. In a binding machine, means for supporting an object to be wound with wire, means for effecting winding of the wire about the object and in a predetermined plane, including means contacting said wire for flexing it away from the object and in the plane of the winding throughout the entire winding operation, and means for moving said wire contacting means in opposite directions.

In testimony whereof, I have hereunto set my hand.

GEORGE D. PARKER.

DISCLAIMER 1,875,260.—*George D. Parker*, Riverside, Calif. BUNDLE BINDING AND TYING MACHINE. Patent dated August 30, 1932. Disclaimer filed December 18, 1939, by the assignee of one-half interest, *Wire Tie Machinery Company*.

Hereby enters this disclaimer to claims 38, 40, 52, 53, 55, 67, 72, 80, 81, 94, 95, 96, 97, 98, and 99 of said Letters Patent.

[*Official Gazette January 16, 1940.*]

DISCLAIMER 1,875,260.—*George D. Parker*, Riverside, Calif. BUNDLE BINDING AND TYING MACHINE. Patent dated August 30, 1932. Disclaimer filed December 18, 1939, by the assignee of one-half interest, *Wire Tie Machinery Company*.

Hereby enters this disclaimer to claims 38, 40, 52, 53, 55, 67, 72, 80, 81, 94, 95, 96, 97, 98, and 99 of said Letters Patent.

[*Official Gazette January 16, 1940.*]